United States Patent [19]

Yoshinobu et al.

[11] Patent Number: 5,592,213

[45] Date of Patent: Jan. 7, 1997

[54] RECEIVING UNIT FOR TWO-WAY BROADCASTING INCLUDING AUTOMATIC DISPLAY OF OPERATING STATE OF A TRANSMITTING SYSTEM

[75] Inventors: Hitoshi Yoshinobu, Kanagawa; Junya Saito, Saitama, both of Japan

[73] Assignee: Sony Corporation, Tokyo, Japan

[21] Appl. No.: 393,978

[22] Filed: Feb. 24, 1995

[30] Foreign Application Priority Data

Mar. 1, 1994 [JP] Japan .................................... 6-055300

[51] Int. Cl.⁶ ........................................ H04N 7/16
[52] U.S. Cl. .................................. 348/13; 348/734
[58] Field of Search ............................ 348/734, 12, 13, 348/16, 725, 729, 906, 569, 6, 7, 10; 455/4.2, 5.1; 340/825.24, 825.22, 825.25, 825.69; H04N 7/16

[56] References Cited

U.S. PATENT DOCUMENTS

| | | | |
|---|---|---|---|
| 5,226,177 | 7/1993 | Nickerson | 348/13 |
| 5,410,326 | 4/1995 | Goldstein | 348/734 |
| 5,523,800 | 6/1996 | Dudek | 348/734 |
| 5,528,281 | 6/1996 | Grady et al. | 348/7 |

FOREIGN PATENT DOCUMENTS 9405117  3/1994  WIPO ...................................... 348/13

*Primary Examiner*—Victor R. Kostak
*Attorney, Agent, or Firm*—Jay H. Maioli

[57] ABSTRACT

A television broadcast receiver capable of transmitting user input data to a predetermined destination associated with the broadcast side and having a remote commander with a two-way button for switching the mode of a television receiver between a mode responsive and a mode nonresponsive to a two-way broadcast program. Buttons provided on the commander are assigned both the function as channel selection buttons of a receiving unit, or the function of data input means for inputting data representing a reply to a two-way broadcast program.

9 Claims, 8 Drawing Sheets

| | | FUNCTIONS OF BUTTONS 34w1~34wb |
|---|---|---|
| TWO-WAY BUTTON | NON-RESPONSIVE MODE | CHANNEL SELECTION CONTROL FUNCTION FOR SELECTING THE CHANNEL PRESET IN EACH BUTTON |
| | RESPONSIVE MODE | FUNCTION AS THE 10-KEY |

PRESCRIPTION FOR DTMF SIGNALS
TRANSMITTED OVER TEL LINE

| ITEMS | ALLOWABLE LIMITS |
|---|---|
| SIGNAL SENDING TIME | 50 msec OR ABOVE |
| MINIMUM PAUSE (MINIMUM PAUSE BETWEEN ADJOINING SIGNALS) | 30 msec OR ABOVE |
| PERIOD (SIGNAL SENDING TIME + MINIMUM PAUSE) | 120 msec OR ABOVE |

| TWO-WAY BUTTON | FUNCTIONS OF BUTTONS 34w1~34wb |
|---|---|
| NON-RESPONSIVE MODE | CHANNEL SELECTION CONTROL FUNCTION FOR SELECTING THE CHANNEL PRESET IN EACH BUTTON |
| RESPONSIVE MODE | FUNCTION AS THE 10-KEY |

FIG. 8

FIG. 9

RECEIVING UNIT FOR TWO-WAY BROADCASTING INCLUDING AUTOMATIC DISPLAY OF OPERATING STATE OF A TRANSMITTING SYSTEM

FIELD OF THE INVENTION

The present invention relates to a television broadcast receiver capable of communicating with a predetermined broadcast side destination.

BACKGROUND OF THE INVENTION

In television receivers commonly in use, various control operations such as turning power on/off, selecting a channel, controlling the volume, and switching to another signal source such as a tape recorder are being performed by the viewer/user using a remote control transmitter (commander).

For the channel selection that is performed frequently, both direct channel selection by means of the so-called 10-keys corresponding to the numbers from "1" to "0" and up-down channel selection by means of, for example, a seesaw type switch or a pair of control buttons that are mechanically independent of each other are practiced.

In the case where both the direct channel selection and the up-down channel selection are practiced with the same commander, the button for the up-down channel selection is disposed in a position of the commander where the button is easily operated and it is often the case that the button is made larger in size.

For controlling the volume, setting of which has a greater degree of freedom and which is frequently controlled, the commander generally has such a control button such as, for example, a seesaw switch which allows up-down volume control by degrees. The control button for volume control is disposed where it is easy to operate, like the up-down channel selection button.

There has so far been given two-way television broadcasting on an experimental basis, in which the broadcasting station side broadcasts television shopping information, questionnairing, quiz programs of audience participation type, and the like, and the viewers send their replies to questions in such programs by telephone or in facsimile. In such two-way broadcasting, it can be considered to enable the viewer to make the reply through the use of the commander.

However, if control buttons for exclusive use for making the reply to the two-way broadcast program are additionally provided on the commander, there arises a problem that the commander becomes larger and, hence, its usability is worsened, or less desirable. Also, such a problem arises that operation mistakes are made by the viewer due to the numerous control buttons/keys.

There has also been made such an operation mistake by the viewer, when a movie program is being broadcast from a television broadcasting station, to mistake it for the one reproduced by a video tape recorder and make such a meaningless or fruitless operation as to push the "fast forward" button.

SUMMARY OF THE INVENTION

The present invention has been made in view of the above described situations. Accordingly, it is an object of the invention to provide a receiving unit for two-way broadcasting designed such that the viewer can send a reply/data to a broadcast station side in response to a two-way broadcast, easily and positively and also provide a remote control unit for the same.

To attain the above mentioned object, a receiving unit for two-way broadcasting according to a first aspect of the invention is structured to include reception means (receiver) for receiving a two-way broadcast program and transmission means for transmitting information of a reply to a received two-way broadcast program to a specific destination. The receiving unit of the present invention includes a display means for displaying the state of the transmission means, and discrimination means (discriminator) for determining the state of the transmission means as to whether the same is in a nonoperative/nonresponsive state (or mode) or the same is in an operative/responsive state (or mode). When it is determined that the transmission means is in a operative/responsive state, the state of the transmission means being operative/responsive is displayed on the display means.

The present invention further includes a remote control unit for controlling the receiving unit for two-way broadcasting. A second aspect of the present invention includes a control means for controlling a receiving unit for receiving a two-way broadcast program and transmitting information of a reply to a received two-way broadcast program to a specific destination associated with the broadcast side of the two-way program broadcast. This aspect of the present invention includes a switching control means (switch control) for switching the operating state of the receiving unit between a responsive state and a non-responsive state, and a display means (display) for displaying the state of the receiving unit. When the operating state of the receiving unit is switched to the responsive state by the switching control means, an indication that the state of the receiving unit is in the responsive state, or mode, is displayed on the display means.

According to the invention structured as described above, the fact that the mode of the receiving unit is switched to the responsive mode is visually indicated on a display means provided on the receiving unit or the commander. Accordingly, the likelihood of viewer error/mistake is lessened/prevented and, thus, the user is able to send/direct a reply to a predetermined location in response to the two-way broadcast program easily and positively.

While the receiving unit is provided with a switching means to switch the state/mode of the receiving unit between a responsive state and a non-responsive state, the fact that the receiving unit upon being switched to the responsive state is in the responsive state is displayed on a display means. Accordingly, the viewer is prevented from making an operation mistake.

DETAILED DESCRIPTION OF THE INVENTION

An embodiment of a receiving unit for use in two-way broadcasting and a remote controlling unit therefor according to the invention will be described below. In the embodiment, a DTMF signal is used as the multi-frequency signal constituting the sub-broadcast information.

Namely, the station side structures the information related to programs, as the sub-broadcast information, in the DTMF signal form and broadcasts it by having it multiplexed (mixed) with the main-broadcast audio signal. On the other hand, the receiver side separates the DTMF signal from the received broadcast audio signal and decodes the DTMF signal to thereby reproduce the information related to programs, stores the information in memory, and utilizes the information in a telephone communication with the service station or for reserving a program.

Figure 2:
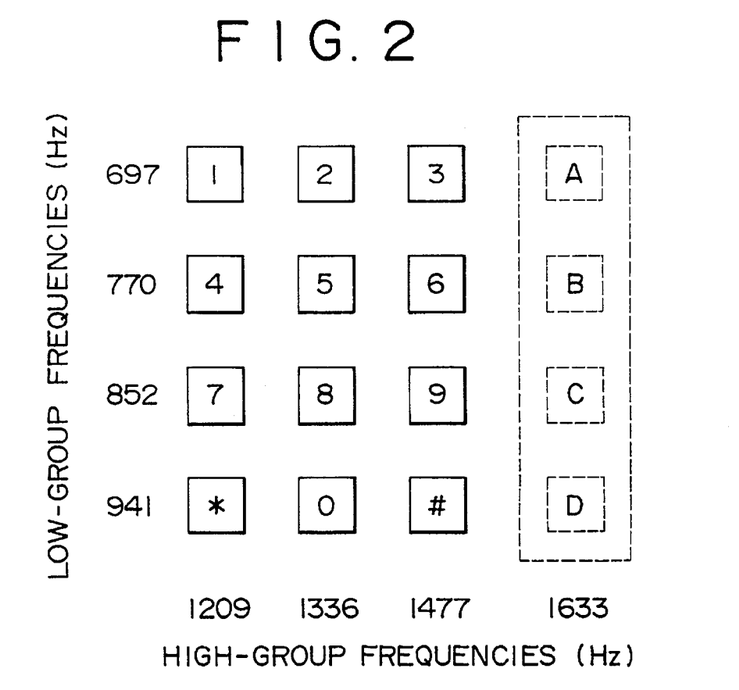
FIG. 2 is a diagram explanatory of a DTMF signal.

Referring first to FIG. 2, the DTMF signal will be described.

The DTMF signaling system is an audio band signaling system simultaneously sending two tones, one from a group of low frequencies (the low group) and the other from a group of high-frequencies (the high group). Each of the groups of low frequencies and high frequencies is constituted of four tones of audio band frequencies, any two of which are not in a harmonic relation with each other.

In the DTMF signal, the four frequencies of the low group are constituted for example of 697 Hz, 770 Hz, 852 Hz, and 941 Hz and the four frequencies of the high group are constituted for example of 1209 Hz, 1336 Hz, 1477 Hz, and 1633 Hz. One frequency each is taken out from the low groups and the high group and these frequencies are combined. The DTMF signals (each of the DTMF signals will hereinafter be called a function signal) constituted of such combinations are assigned to push buttons "0"–"D" arranged in four rows and four columns as shown in FIG. 2.

In the telephone communication, of the function signals in 16 combinations of the DTMF signals, only 12 combinations are generally used as the signals for the subscriber's address (the telephone number). More specifically, the function signals of 12 combinations are assigned to the numbers "0"–"9", as the ten keys, and the symbols "*" and "#" that are used in the telephone set. The function signals corresponding to characters "A", "B", "C", and "D" indicated in FIG. 2 with broken lines are not generally used in Japan but they are only used in data transmission utilizing the push button (PB) dial.

Figure 3:
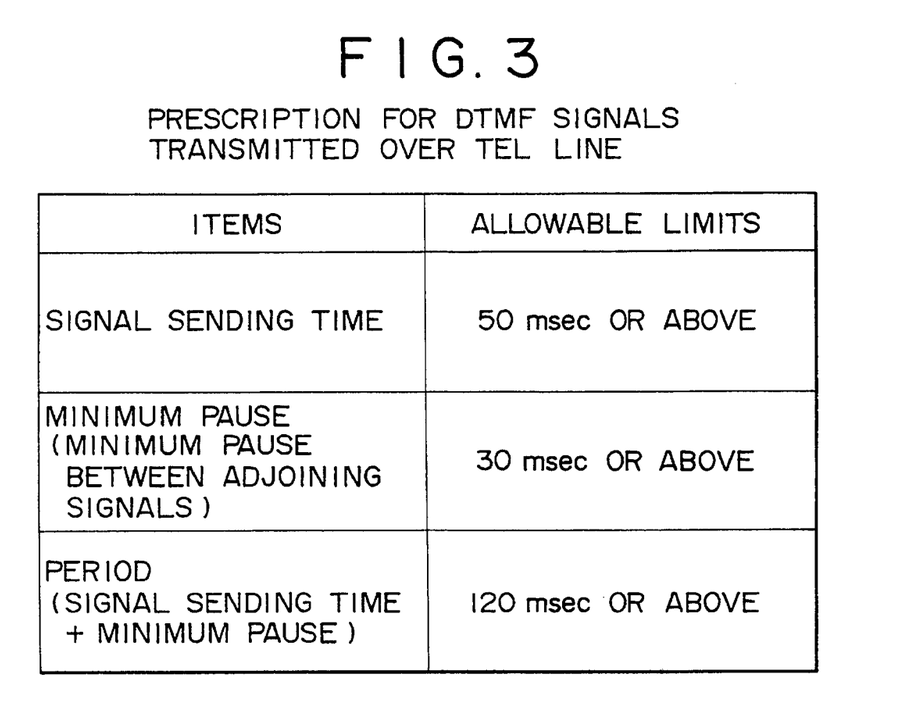
FIG. 3 is a diagram explanatory of transmission conditions of a DTMF signal.

In performing line selection according to the telephone number with the use of the DTMF signals, conditions for transmitting the signal are prescribed as shown in FIG. 3.

By virtue of the combination of two frequencies and the prescribed conditions for transmission as described above, the DTMF signal becomes such that is scarcely generated in the natural world, and because it can be clearly distinguished from natural sounds such as human voice, it can be broadcast multiplexed (mixed) with an ordinary broadcast audio signal and, on the receiver side, it can be separated relatively easily.

The DTMF signal is being utilized also in the multi-function telephone service. Namely, by operating buttons of a push-button telephone set located far away from home, it is possible to reproduce received messages recorded in an automatic answering telephone set at home, to record or reproduce self-answering messages in the telephone, or to erase a received message.

The transmitter side in the embodiment, i.e., the side of a broadcasting station, in transmitting sub-broadcast information, uses the function signals "A", "B", and "C", of the function signals "A", "B", "C", and "D" that are not used for PB line selection as described above, as transmission starting information of the sub-broadcast information and uses the function signal "D" as transmission ending information.

Since there are three kinds of transmission starting information, it is made possible in the present case to transmit three kinds of sub-broadcast information distinguished from one another. More specifically, each of the three kinds of sub-broadcast information is broadcast marked off by any of the functional signals "A", "B", and "C" at the start and by the function signal "D" at the end.

For example, information about replying access to a two-way program, i.e., sub-broadcast information such as the telephone number to be accessed (the accepting telephone number) and the transmission rate, is put between the function signal "A" as the transmission starting information and the function signal "D" as the transmission ending signal; sub-broadcast information for setting environmental conditions, such as restrictions on the telephone numbers on the replier side by the last digit of the telephone number and setting of the current time, is put between the function signal "B" and the function signal "D"; and information about clearing receive data is put between the function signal "C" and the function signal "D". Then, these signals are broadcast multiplexed with an ordinary broadcast signal.

The receiver side recognizes numeric and symbolic data put between any of the function signals "A", "B", and "C" as the transmission starting information and the function signal "D" as the transmission ending information as a train of sub-broadcast data (a group of information), and such data are stored at predetermined storage areas of memory, distinguished from one another as described later.

For example, when a receiving set whose interactive television specification version is 00 is allowed by information about replying access to access an accepting telephone number 0990-1234-1234 at a transmission rate of 300 bps, then, the sub-broadcast information having a train of data formed of such DTMF function signals as

00#0990*1234*1234 put between the function signal "A" and the function signal "D" is transmitted multiplexed with a main-broadcast audio signal. Of the train of data, the data 00 at the start indicates that the interactive television specification version is 00 (the transmission rate is 300 bps) and the numeric data after the symbol "#" indicates the accepting telephone number.

When a receiving set whose interactive television specification version is 01 is allowed to access an accepting telephone number 0990-1234-1235 at a transmission rate of 1200 bps, a train of data formed of such DTMF function signals as

01#0990*1234*1235 put between the function signal "A" and the function signal "D" is transmitted multiplexed with a main-broadcast audio signal. At this time, the data 01 at the start of the train of data indicates that the interactive television specification version is 01 (the transmission rate is 1200 bps) and the numeric data after the symbol "#" indicates the accepting telephone number.

In the train of data about replying access as described above, the symbol "#" represents a separator (a partition between individual data) and the symbol "*" represents a pause.

As information for setting environmental conditions, when access is limited only to viewers with specific telephone numbers (subscriber's numbers), for example when telephone numbers whose last digit is 0 only are allowed to access, a train of data formed of such function signals as

0#0, and when telephone numbers whose last digit is 1 only are allowed to access, a train of data formed of such function signals as

0#1, is output, each being sandwiched between the function signal "B" and the function signal "D" and multiplexed with a main-broadcast audio signal. In this case, the numeral "0" before the symbol "#" means that the telephone numbers having the numeral following the symbol "#" as the last digit are allowed to access.

When the telephone numbers whose last digits are even only are allowed to access, a train of data formed of such DTMF function signals as

0#0*0#2*0#4*0#6*0#8 is output sandwiched between the function signal "B" and the function signal "D" and multiplexed with a main-broadcast audio signal. In this case, the symbol "*" means the logical sum.

As time information for reservation of reception or reservation of recording of a broadcast program, when for example the current time is "1993.12.15, Tuesday, 7:00", a train of data formed of such DTMF function signals as

1#1993121520700 is output sandwiched between the function signal "B" and the function signal "D" and multiplexed with a main-broadcast audio signal.

Further, when a broadcast program is broadcast from 7:00 to 7:29 next Sunday seen from the current point of time, a train of data formed of such DTMF function signals as

10#07000729 is output sandwiched between the function signal "B" and the function signal "D", and when another broadcast program is broadcast from 12:00 to 14:15 next Monday seen from the current point of time, a train of data formed of such DTMF function signals as

11#12001415 is output sandwiched between the function signal "B" and the function signal "D".

In trains of data about setting of environmental conditions as described above, the symbol "#" represents a separator and the symbol "*" represents "OR (the logical sum)".

As information about clearing receive data, for example in the case where limitation of telephone numbers is cleared, a train of data formed of such DTMF function signals as

99#0 is output sandwiched between the function signal "C" and the function signal "D". In the case where the accepting telephone number is cleared, a train of data formed of such DTMF function signals as

99#1 is output sandwiched between the function signal "C" and the function signal "D".

As described above, the function signals "A", "B", "C", and "D", which are not used as a telephone line select signal, are used as the transmission starting information and transmission ending information of sub-broadcast information. Therefore, even if DTMF sounds are transmitted for example when a telephone call is made in a scene of a drama, they will not be mixed up with information related to program. Further, the sub-broadcast information can be transmitted and received positively.

Referring now to FIG. 1 and FIG. 4–FIG. 7, an embodiment of a receiving unit for use in two-way broadcasting of the invention applied to a television receiver will be described below.

Figure 4:
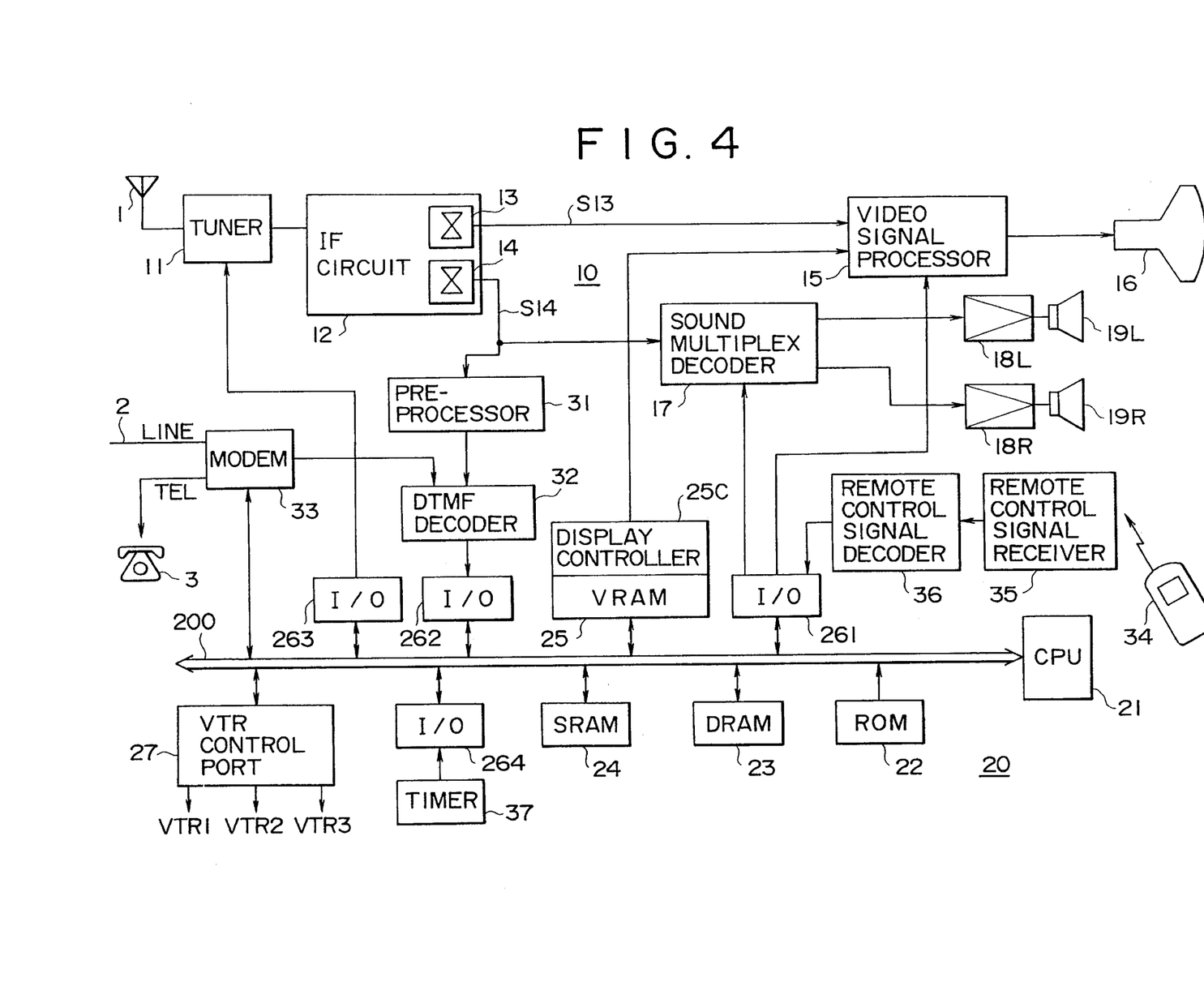
FIG. 4 is a block diagram showing a structure of an embodiment of the invention.

A structure of the embodiment of the receiving unit for use in two-way broadcasting in the present example is shown in FIG. 4. Referring to FIG. 4, reference numeral 10 denotes a signal system of the television receiver and 20 denotes a control system of the same.

A broadcast signal received by an antenna 1 is supplied to a tuner 11. To the tuner 11, a channel select signal from the control system 20 is supplied. A broadcast signal of a desired channel is selected and converted to an intermediate-frequency signal in the tuner 11. The intermediate-frequency signal is supplied to an intermediate-frequency circuit 12. The intermediate-frequency circuit 12 includes a video demodulator 13 and an audio demodulator 14 and, thereby, a video signal and an audio signal are demodulated.

The video signal S13 from the video demodulator 13 is supplied to an image receiving tube 16 through a video signal processing circuit 15. The audio signal S14 from the audio demodulator 14 is supplied to a sound multiplex decoder 17 and, therein, bilingual signals or stereo signals SL and SR are decoded. The signals SL and SR are supplied to left and right speakers 19L and 19R through their respective amplifiers 18L and 18R.

The audio signal S14 from the audio demodulator 14 is also supplied to a DTMF recorder 32 through a preprocessing circuit 31. The DTMF recorder 32 searches the input signal for a DTMF signal at all times, and when it detects a DTMF signal, decodes it to find out what function signal the DTMF signal indicates. More specifically, it decodes numeric data "0"–"9", "#", "*", "A"–"D" and supplies the decoded data to the control system 20.

In the present example, for the DTMF decoder 32, a DTMF recorder available at the market and in general use is employed. The preprocessing circuit 31 is provided for performing preprocessing of the signal such that more accurate decoding of a DTMF signal can be achieved even when such a DTMF decoder available at the market is used for the DTMF decoder 32. More specifically, the preprocessing circuit 31 is constituted of a filter circuit and eliminates other frequency components than a DTMF signal from the audio signal S14 so that the input signal to the DTMF decoder 32 becomes a signal acceptable by such a marketed DTMF decoder.

In the present embodiment, there is provided a modem (modulator/demodulator) 33 so that participation in two-way broadcast programs, for example replying to an audience participation program, can be made. A line connection terminal Line of the modem 33 is connected with the telephone line 2 and a telephone terminal Tel is connected with the telephone set 3. The modem 33 is connected to a system bus 200 of the control system 20. Further, data from the modem 33 is supplied to the DTMF decoder 32. Thus, it is made possible to have a DTMF signal, transmitted over the telephone line 2, decoded in the DTMF decoder 32 and received by the control system 20.

The control system 20 includes a CPU 21, a ROM 22, a DRAM 23, an SRAM 24, and a video RAM 25V, all connected to the system bus 200. The ROM 22 stores various control programs inclusive of an accepting and processing program of DTMF data to be described later and, further, it stores data of fonts and graphics used for displaying. The DRAM 23 is mainly used as work area for calculation, while the SRAM 24 stores information for setting of the receiving unit itself and information for identifying its own television unit.

The video RAM 25V is used for displaying. For the video RAM 25V, a display controller 25C is provided. The display controller 25C controls read and write of video data in the video RAM 25V and also converts the read video data into an analog video signal. The analog video signal obtained from the display controller 25C is supplied to the video signal processing circuit 15, which is controlled by a control signal from the control system 20 and, thereby, the analog signal is superimposed on the video signal coming from the intermediate-frequency circuit 12 or combined therewith by being switched.

The control system 20 further includes I/O ports 261, 262, 263, and 264 and a VTR control port 27. Through the I/O port 261, a control signal is supplied to the video signal processing circuit 15 and the sound multiplex decoder 17. Further, a remote control signal by, for example, an infrared ray from a remote controller 34 is received by a remote control signal receiver 35 and the received remote control signal is decoded in a remote control signal decoding circuit 36 and the decoded remote control signal is received by the control system 20 through the I/O port 261.

Control corresponding to operations made by the user using the remote controller 34 is executed by the CPU 21 according to the program stored in the ROM 22. For example, when a remote control operation for channel selection or volume control is made, tuner selection or volume control is executed and, at the same time, the font data for displaying necessary characters and symbols are read from the ROM 22 and transferred to the video RAM 25V. Data from the video RAM 25V is supplied to the video signal processing circuit 15 and combined therein with the video signal S13 (for example, superimposed on the same) and, thereby, the data is displayed on the screen of the image receiving tube 16 for a suitable period of time.

The data for channel selection or volume control is written into the nonvolatile SRAM 24 each time the operation therefor is made. Thereby, the so-called last memory function, i.e., the function enabling, when power is once turned off and then turned on, the channel selected immediately before the power cut to be viewed with the same volume, is performed.

Through the I/O port 263, a channel select signal is supplied to the tuner 11. Further, in this embodiment, time data from a timer circuit 37 for informing the real time or for generating an interrupt for a designated period of time is input to the control system 20 through the I/O port 264.

The VTR control port 27 in this example is designed such that control for VTR1, VTR2, and VTR3 are possible. The control system 20 supplies a control signal to a VTR through the control port 27 and receives a status signal from the VTR and, thereby, performs desired control of the VTR.

Each of the VTRs incorporates a tuner and an intermediate-frequency circuit and, being connected to the antenna 1 for example through a distributor, they can make reservation of recording under the control of the control system 20.

In the present embodiment, since information related to a program put in the form of the DTMF signal is multiplexed with the audio signal of the program, the receiver side can use a low-priced circuit, such as a DTMF receiver chip, in an IC form and mass-producible. As a result, a receiver lower in price than a receiver adapted to the multiplexed text broadcasting can be provided.

Different from a receiver adapted to the multiplexed text broadcasting system, the receiver of the embodiment can support various broadcasting systems with its circuitry unchanged and hence it does not affect the broadcasting systems hitherto in use.

The transmission rate of information in the embodiment, as apparent from the above described period of the DTMF signal, is around 8 characters/second and extremely slower than the transfer rate of information in the multiplexed text broadcasting system. This slow transmission rate does not pose any serious problem because the quantity of necessary information is not great as described above.

Figure 5:
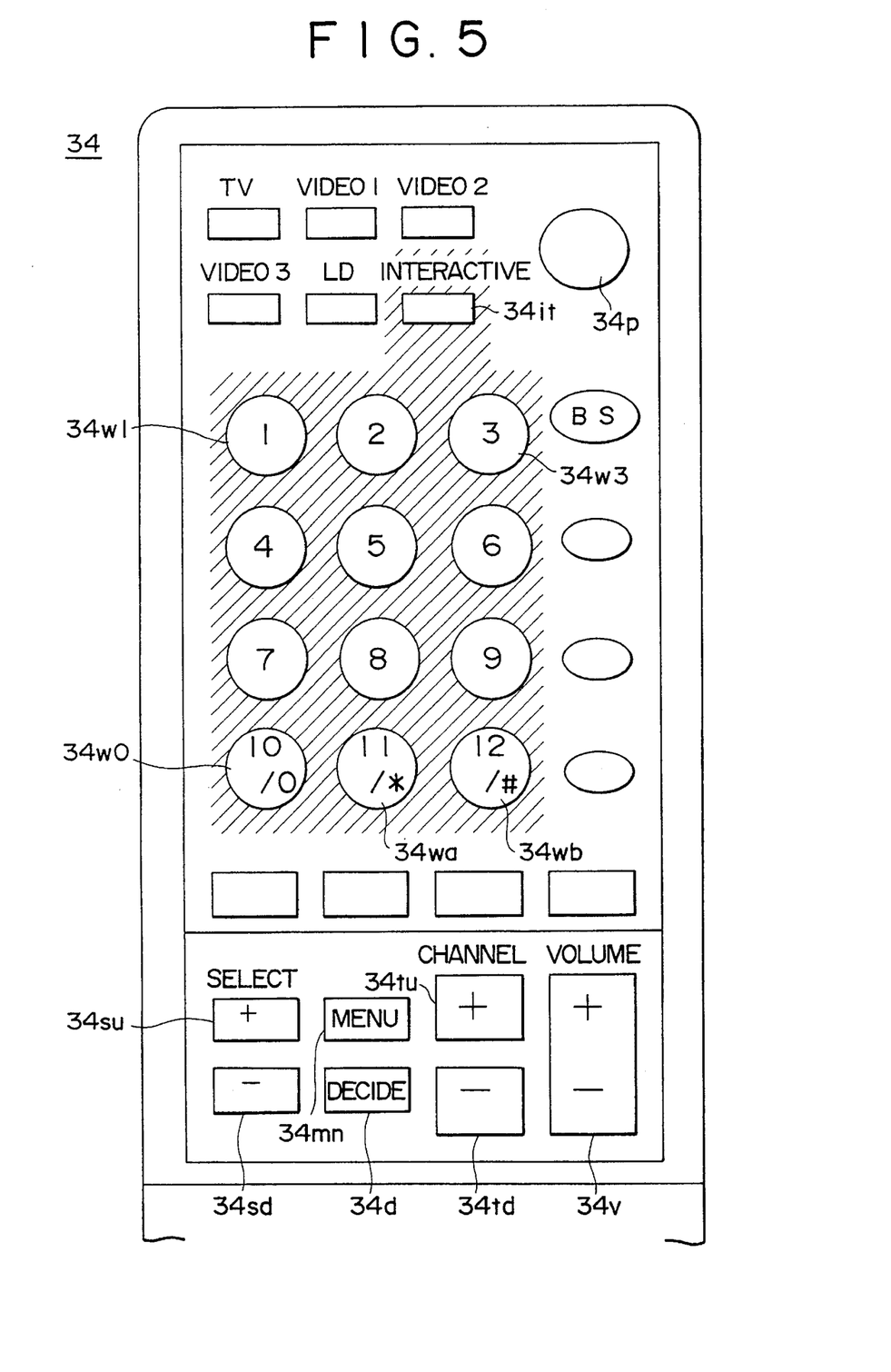
FIG. 5 is a front view showing a structure of the present invention.

As shown in FIG. 5, the commander 34 in the embodiment, similarly to an ordinary commander, includes a power button 34$p$ for on/off controlling of power for the television receiver, seesaw buttons 34$tu$ and 34$td$ for controlling channel selection, and a seesaw button 34$v$ for controlling volume and, further, includes a 10-key type channel selection buttons 34$w1$ –34$wb$ for direct channel selection.

In the present embodiment, to cope with two-way broadcasting, there are provided a menu button 34$mn$, seesaw buttons 34$su$ and 34$sd$ for up and down selecting operations, and a decide button 34$d$ for inputting a decision on a menu selecting operation. Further, there is provided an interactive button (two-way button) 34$it$ for switching the mode of the television receiver between an ordinary mode (nonresponsive mode) and a responsive mode to questions in a two-way broadcast program. The two-way button 34$it$ in the present example is of the so-called non-lock type, i.e., every time the button is operated, the receiving unit is alternately set into the nonresponsive mode and the responsive mode. As a matter of course, the two-way button 34$it$ may be formed of a button switch of a lock type so that an on state is brought about when the button is pushed and the receiving unit is thereby set into the responsive mode.

In the present embodiment, as described later, a plurality of replies to a multiple-choice question in the two-way broadcast program are assigned to the direct channel selection buttons 34$w1$–34$wb$. Therefore, the two-way button 34$it$ is arranged adjacent to the direct channel selection buttons 34$w1$–34$wb$ and, in addition, these buttons are for example colored as indicated by oblique lines in FIG. 5 to show that these buttons belong to the same group.

Figure 6:
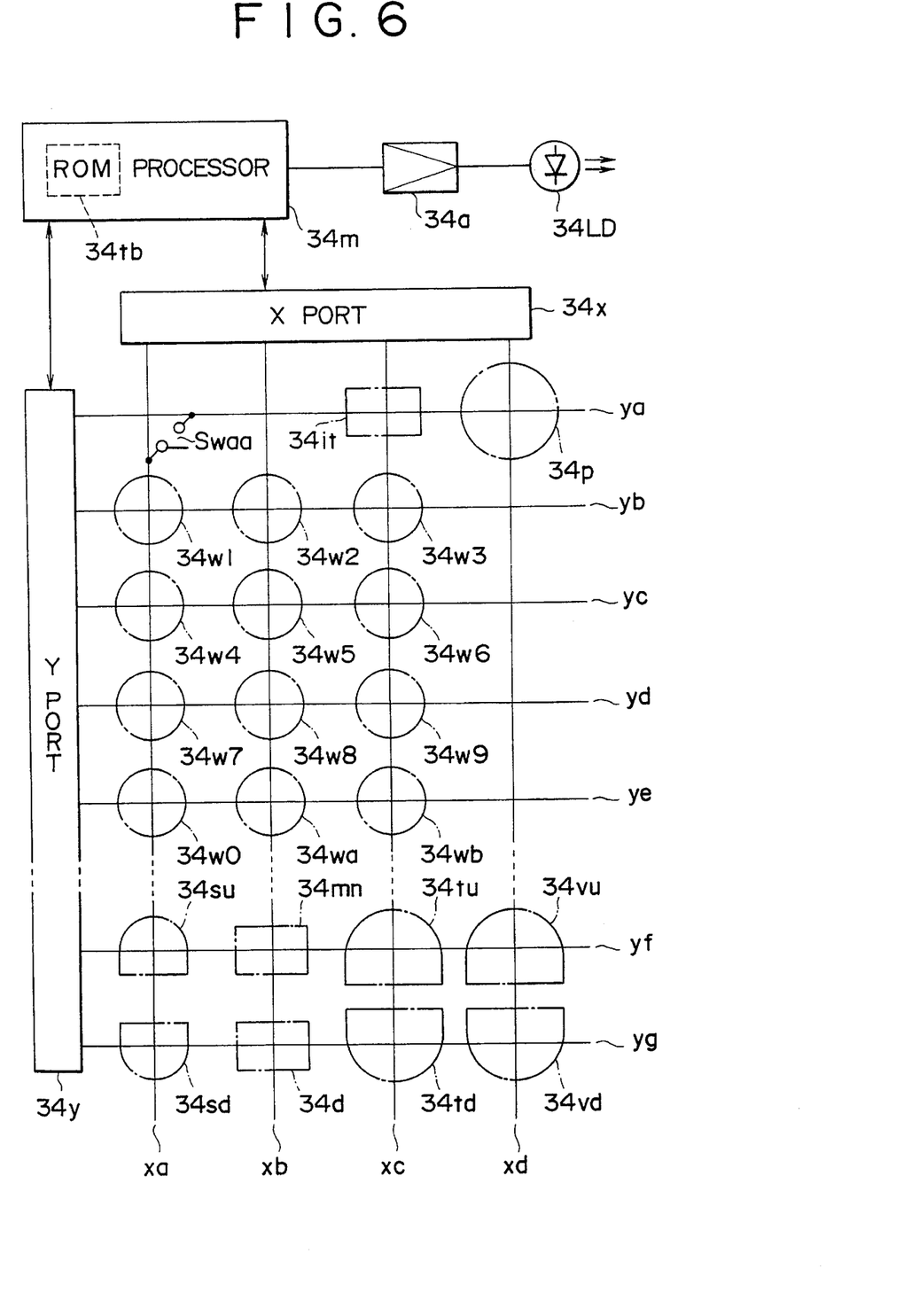
FIG. 6 is a block diagram showing a structure of the present invention.

As shown in FIG. 6, the buttons 34$d$–34$w$ correspond to intersections of connected lines xa–xd to an X port 34$x$ and connected lines ya–yg to a Y port 34$y$. At the intersections, there are arranged switches in a matrix array (represented by a switch SWaa in FIG. 6) for turning on/off the connections between the connected lines xa–xd and ya–yg.

The commander 34 is in a sleep state when no button thereon is pushed, and it is set into an operative state when a button is pushed and then the microprocessor (CPU) 34$m$ scans the X port 34$x$ and the Y port 34$y$ and identifies the position of the pushed button. While the button is pushed, the remote control signal (command) corresponding to the button is output from the CPU 34m and input, through an amplifier 34a, to a light emitting diode 34LD to drive it. The remote control signal by infrared ray from the diode 34LD is received by the remote control signal receiver 35 on the side of the television receiver and the signal is processed as described above and received by the control system 20.

In the embodiment, when the two-way button 34it on the commander 34 is operated and the television receiver is thereby set into the responsive mode, the control functions of the direct channel selection buttons w1–wb are converted such that the numerals shown in FIG. 5 correspond to each of the direct channel selection buttons 34w1–34wb can be used for choosing a reply to a multiple-choice question in a two-way broadcast program. Namely, in this example, the buttons 34w1–34wb, in the responsive mode, function as the so-called 10-key.

Figure 7:
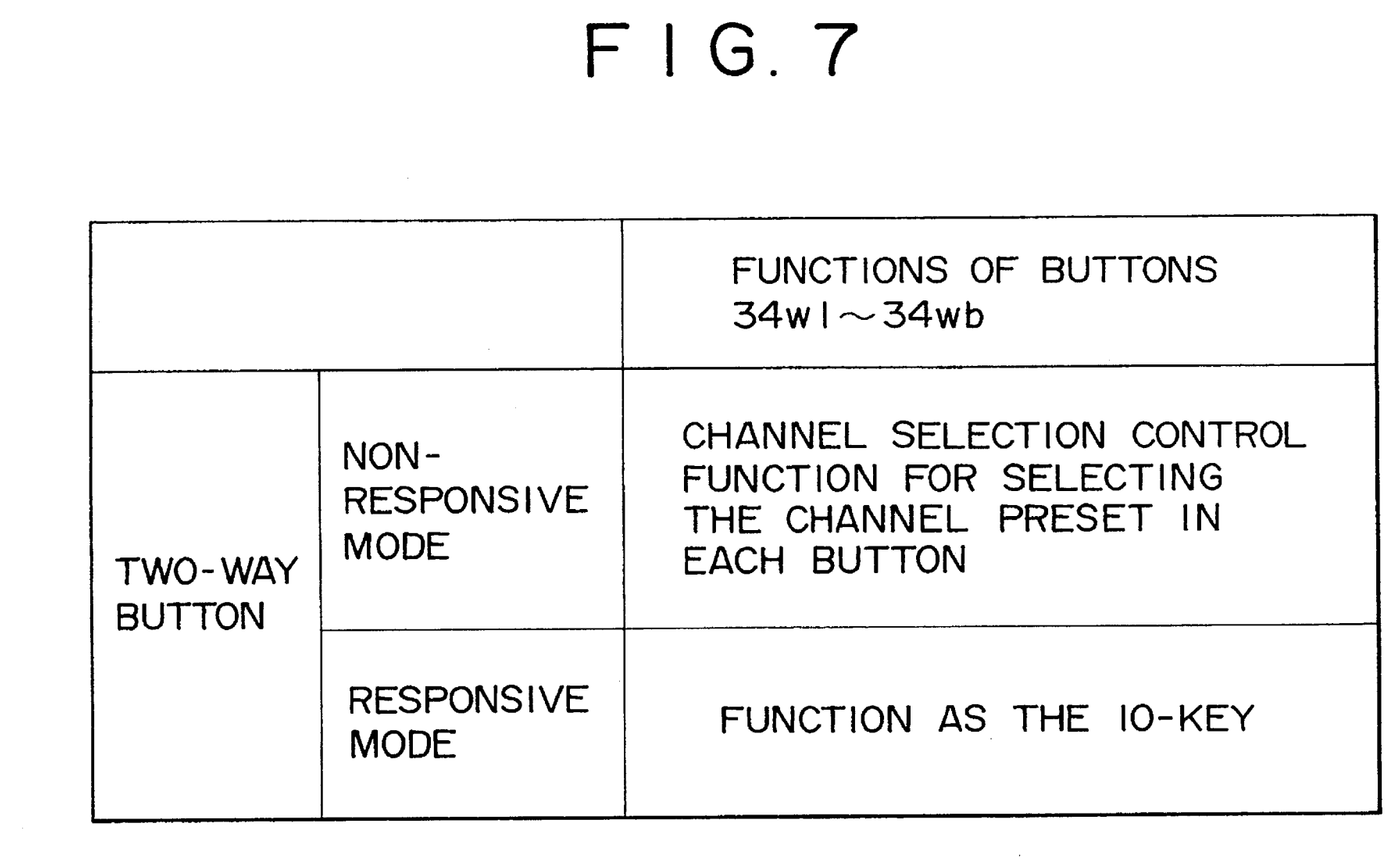
FIG. 7 is a table describing of the present invention.

In the present example, a conversion table for use in converting the control functions of the buttons 34w1–34wb according as the television receiver is in the responsive mode or in the nonresponsive mode is provided in the ROM 22 of the control system 20 in the television receiver. The outline of the conversion table is shown in FIG. 7. When the mode of the receiving unit set by the two-way button 34it is the nonresponsive mode, the buttons 34w1–34wb work as those having controlling functions as direct channel selection buttons and, when the mode is the responsive mode, they work as those having functions as the 10-key for directly making a choice.

The choice in the responsive mode can also be made on the screen by operating the seesaw buttons 34su and 34sd for up and down selecting operations disposed on the commander 34.

Now, the mode change-over process in the embodiment shown FIG. 4 will be described with reference also made to FIG. 1.

We assume that the television receiver of FIG. 4, in its initial state, is in the normal signal receiving state (normal mode=nonresponsive mode). In the normal mode, control is executed such that, when any of the direct channel selection buttons 34w1–34wb, the button 34w1 for example, is pushed, the tuner 11 of the television receiver is switched so as to select the broadcast channel assigned to the pushed button 34w1, the channel 1 for example.

Figure 1:
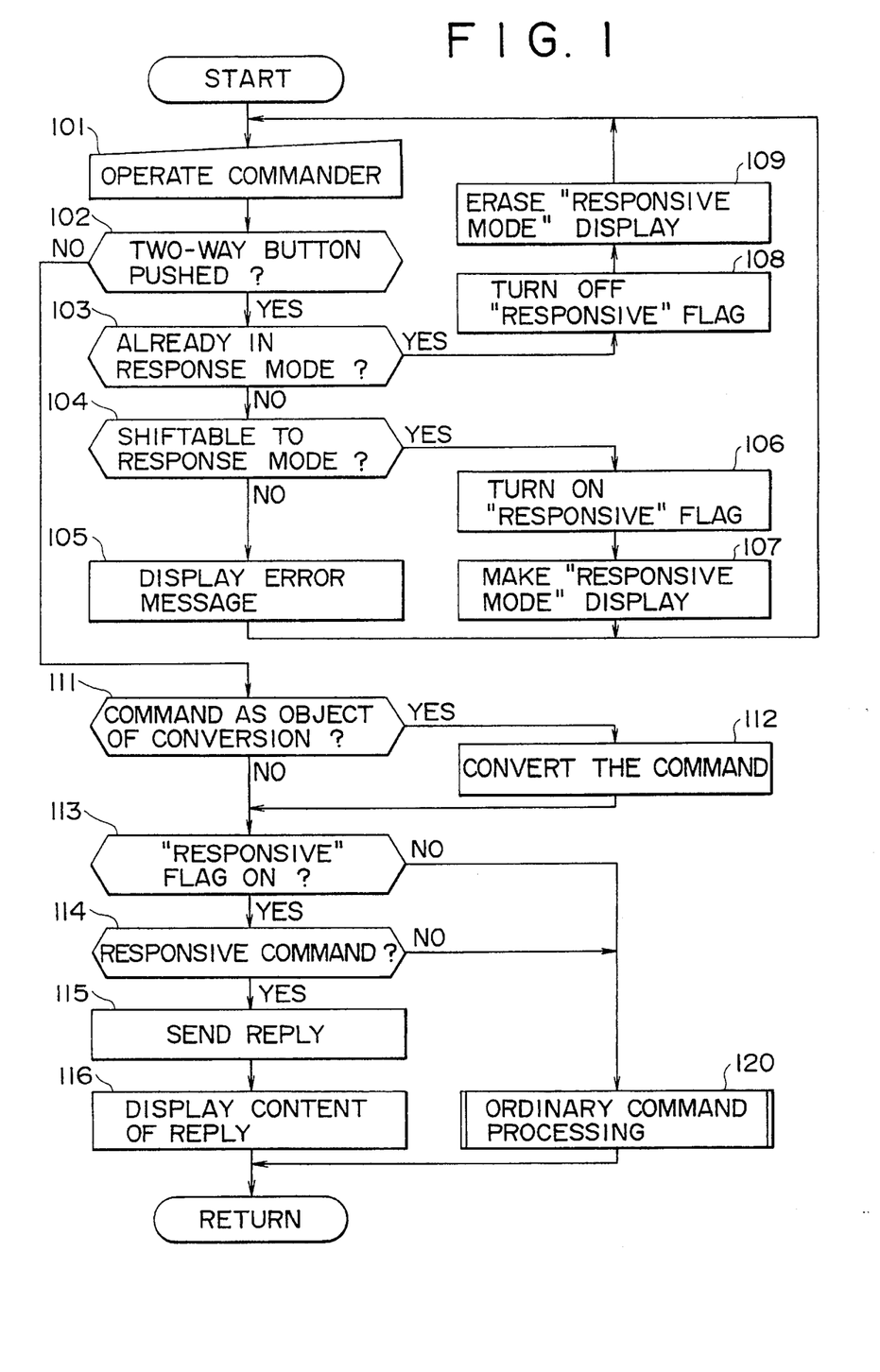
FIG. 1 is a flowchart of operations performed in an embodiment of the present invention.

When it is detected, in step 101 of FIG. 1, that a button on the commander 34 is pushed, it is checked, in following step 102, whether the two-way button 34it has been pushed according to the remote control signal received by the remote control signal receiver 35 on the side of the television receiver.

When the two-way button 34it has been pushed, it is checked, in following step 103, whether the television receiver is already in the responsive mode. If it is not in the responsive mode, it is checked, in following step 104, whether the television receiver is shiftable to the responsive mode.

when the program being received is not that of a two-way broadcasting, or when a two-way broadcast program earlier recorded is being reproduced and, hence, replying to the program is meaningless, it is impossible to shift the television receiver to the responsive mode. Therefore, font data of the necessary characters and symbols are read from the ROM 22 and transferred to the video RAM 25V and, therein, an image for an error message is formed and the error message is displayed on the screen of the image receiving tube 16 by characters or an icon (pictorial symbol) (Step 105) for a suitable period of time.

As to the shifting to the responsive mode, it is also considered practicable to enable the receiver side to shift the television receiver to the responsive mode only when, after the receiver side transmitted its request for participation in a two-way broadcast program to the station side through the modem 33, a permission for the participation has been received from the station side through the modem 33.

When it is possible to shift it to the responsive mode in step 104, the processing is advanced to step 106, and therein a "responsive" flag indicating that the television receiver is in the responsive mode is turned on. At the time when the "responsive" flag is turned on, the television receiver is set into the responsive mode to the two-way broadcast program. In this responsive mode, if a replying operation is made by pushing a button in the region indicated by oblique lines in FIG. 5, the modem 33 is brought into its operative state.

In the embodiment, when the two-way button 34it of the commander 34 is operated and the mode of the television receiver is thereby changed to the responsive mode, the control function of the buttons 34w1–34wb is changed over so as to choose a reply to a multiple-choice question in a two-way broadcast program according to the numerals indicated on the direct channel selection buttons 34w1–34wb.

To achieve the conversion of the function of the control buttons, a conversion table stored in the ROM 22 on the side of the television receiver is used as described above. More specifically, a direct channel select command received by the remote control signal receiver 35 is changed over according to the conversion table so that the CPU 21 recognizes it as a reply command.

Figure 8:
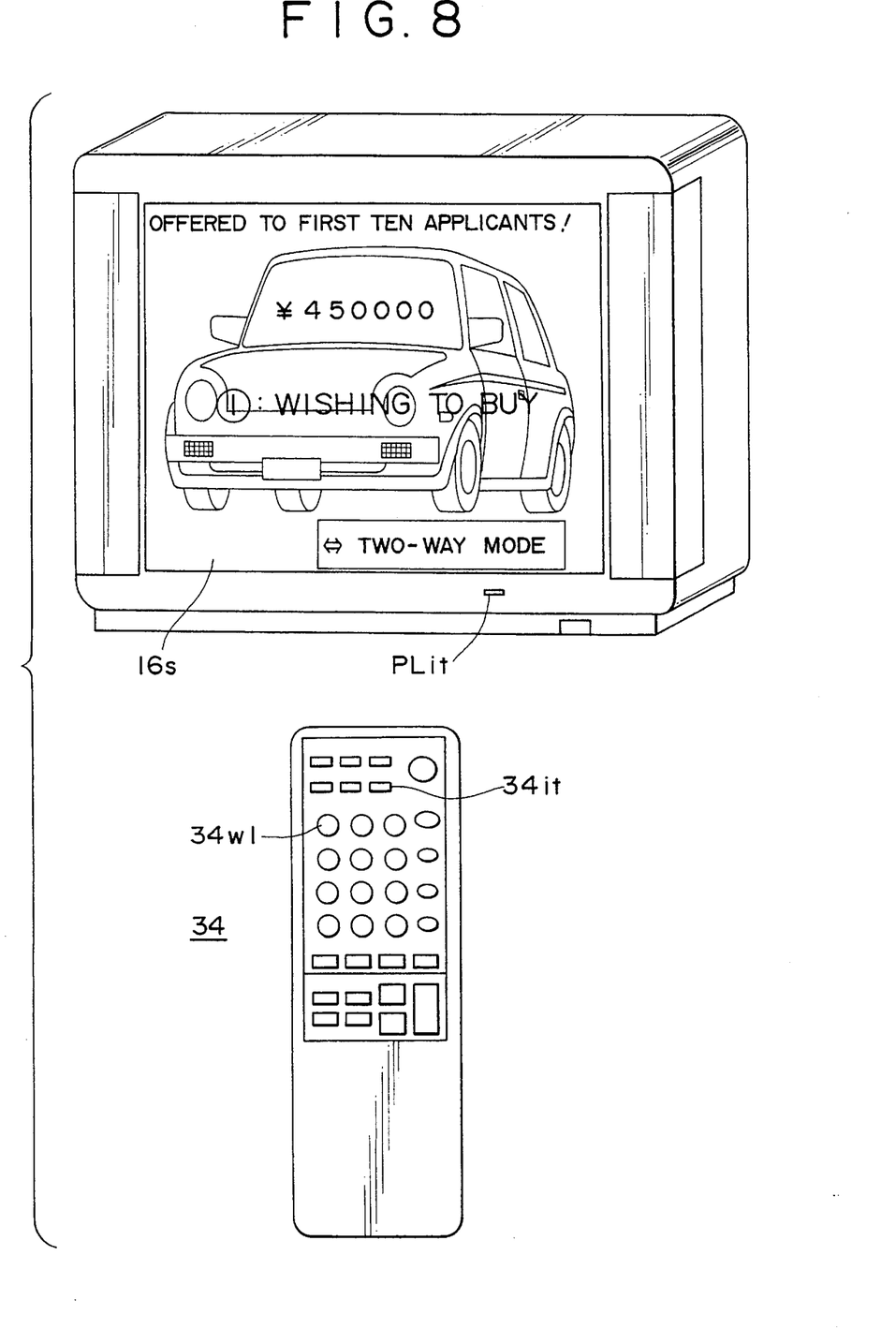
FIG. 8 is a conceptual diagram of the working of the present invention.

In following step 107, an image indicating the mode to be the responsive mode is formed on the video RAM 25V with the necessary font data read from the ROM 22 and the image is displayed on the screen 16s of the image receiving tube 16 in the form of characters or icons, pictorial symbols, in an overlaid manner as shown in FIG. 8.

The processing is returned to step 101 from step 107 or step 105, and when the two-way button 34it is pushed again in step 101, the processing, through steps 102 and 103, is advanced to step 108, in which the "responsive" flag is turned off and the responsive mode is ended. In following step 109, the display image on the video RAM 25V is cleared and the display indicating the mode to be the responsive mode on the screen 16s of the image receiving tube 16 is erased.

If another button than the two-way button 34it on the commander 34 is pushed when the processing is returned to step 101 after the television receiver has been set into the responsive mode through the processing in steps 106 and 107, the processing is advanced to step 111, in which it is checked whether the remote control signal received by the remote control signal receiver 35 is a command as an object of conversion according to the conversion table on the ROM 22.

When the volume control button 34v, for example, has been pushed and, thereby, a command not an object of conversion has been received, the command is not converted but treated as a real command. Further, when the direct channel selection button 34w1, for example, was pushed and a command as an object of conversion has been received, the processing is advanced to step 112 and the command is converted according to the conversion table to a reply command for sending "1" as a reply to a three-choice question, for example, in the two-way broadcast program.

In following steps 113 and 114, it is checked whether the "responsive" flag is in an on state, i.e., the television receiver is in the responsive mode, and the command from the commander 34 is a reply command. Only when the "responsive" flag is on and the command is a reply command, the processing is advanced to step 115, and, therein, for example "1" as a chosen reply is transmitted addressed to a specified telephone number stored in the DRAM 23 through the modem 33.

In this case, the chosen reply and its content is displayed on the screen 16s of the image receiving tube 16 by characters or icons as shown in FIG. 8 in an overlaid manner for a certain period of time (step 116).

When the "responsive" flag is not on or the command from the commander 34 is not a reply command in step 113 and step 114, the command is treated as an ordinary command in step 120.

The processing is returned from step 120 or step 116 to step 101, in which the system is set on standby to wait for an operation of the commander 34.

In the embodiment, as described above, the mode of the television receiver is alternately switched between the responsive mode and the ordinary mode according as the two-way button 34it of the commander 34 is operated. In the responsive mode, an indication of the mode being in the responsive mode is displayed on the screen 16a of the image receiving tube 16.

Thus, the viewer is enabled to know the existing mode of the television receiver. Hence, the user is prevented from making such an operation mistake as to take the existing mode, when it is the responsive mode, for the ordinary mode and send a reply with the intention to select a channel, and eventually pay telephone charges for such fruitless use.

In the embodiment, when the television receiver is in the responsive mode, the direct channel select command assigned to each of the buttons 34w1–34wb of the commander 34 is converted, according to the conversion table stored in the ROM 22, to a reply command to give a choice the number of which corresponds to the channel number.

By virtue of the design made as described above, the need for increasing the control buttons on the commander for issuing reply commands can be eliminated and, hence, the commander can be kept similar in size to the conventional commanders.

While the direct channel selection buttons, which are frequently used by the user and, hence, the user is accustomed to handling of the same, are used, control is executed such that the numbers of the control buttons as they are become the numbers of the reply commands in the responsive mode. Therefore, the commander can be operated easily and, hence, usability of the commander hitherto in use can be maintained in the embodiment.

Although, in the above described embodiment, the design has been made such that a conversion table to be used for converting the function of the direct channel selection buttons 34w of the commander 34 is stored in the ROM 22 in the television receiver, a ROM 34tb storing the same conversion table as stored in the ROM 22 may be provided in the processor 34m mounted on the commander 34 as shown in FIG. 6, so that predetermined command conversion is performed on the side of the commander 34 and then a remote control signal is transmitted therefrom.

In this case, an operation of the two-way button 34it on the commander 34 is detected and, thereby, the television receiver is set into the responsive mode. When any of the buttons 34w1–34wb is pushed after the two-way button 34it has been operated, the reply command converted according to the conversion table provided in the ROM 34tb is transmitted to the remote control signal receiver 35 of the television receiver.

Figure 9:
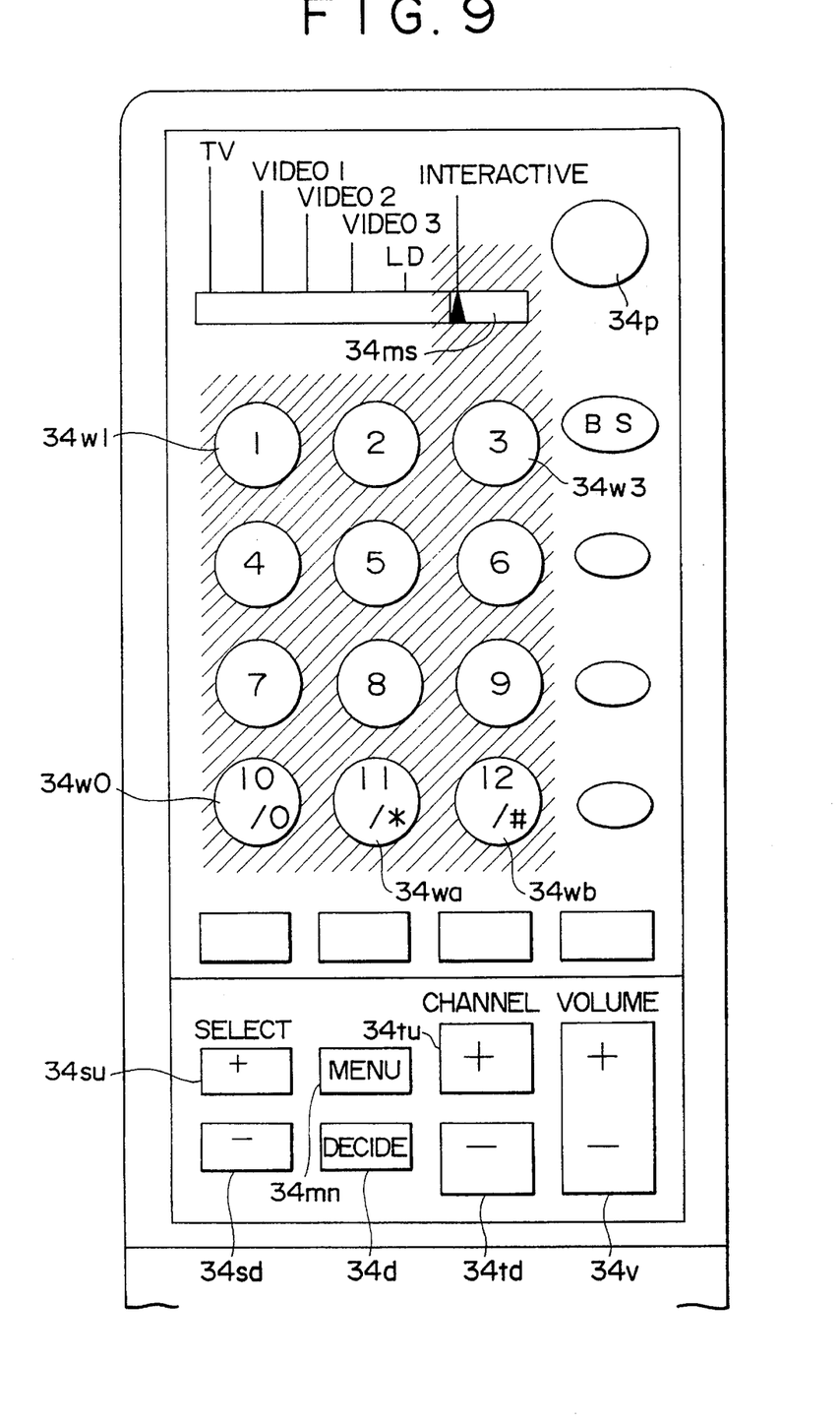
FIG. 9 is a front view showing another structure of the present invention.

Although, it is designed in the above described embodiments such that the mode of the television receiver is switched between the responsive mode and the nonresponsive mode by operation of the two-way button 34t on the commander 34, a slide switch 34ms may be provided on the commander 34 as shown in FIG. 9 so that the switching of the mode of the television receiver between the nonresponsive mode and the responsive mode and switch selection of the input signal to the television receiver in the nonresponsive mode are performed by operating the slide switch 34ms.

In this case, when the slide switch 34ms is in the switching position within the range indicated by oblique lines in FIG. 9, the mode of the television receiver is the responsive mode. Further, when it is in other positions, the input signal source of the television receiver is clearly shown there.

Further, while the mode of the television receiver is designed to be displayed on the screen of the image receiving tube 16 in the above described embodiments, a pilot lamp (light emitting diode) PLit exclusively for indicating that the mode is the responsive mode may be provided at the lower portion of the front face of the television receiver as shown in FIG. 8 so that the pilot lamp is lighted or flashed in the responsive mode. As an alternative, the power pilot lamp (not shown) may be adapted to be flashed in the responsive mode.

Otherwise, light emitting diodes may be incorporated in the two-way button 34it and the direct channel selection buttons 34w1–34wb so that the light emitting diode in the two-way button 34it or the light emitting diode in the channel selection buttons operable in the responsive mode, for example the channel selection button 34w1 is lighted or flashed. As a matter of course, a light emitting diode indicating that the mode is the responsive mode may be separately provided on the commander 34.

Further, although the information related to two-way broadcast programs is multiplexed with the broadcast signal after being formed into DTMF signals in the above described embodiments, the information related to two-way broadcast programs may be superimposed, the same as in the multiplexed text broadcasting system, on the television signal utilizing idle horizontal scanning periods within the vertical blanking period, or the data may be multiplexed as sub-channel sound signal in the voice multiplexed broadcasting.

As the broadcasting systems to which the two-way broadcasting, which is the object of the present invention, is applicable, television broadcasting by ground wave, FM and AM radio broadcasting, satellite broadcasting, and CATV (cable television) can be mentioned.

In the above described embodiments, the reply information to the two-way broadcast program has been transmitted through a telephone line. When a CATV cable is a two-way cable, the reply information can of course be transmitted through the two-way cable.

According to the present invention as described in the foregoing, there is provided a two-way button for switching the mode of a receiving unit between the mode responsive and the mode nonresponsive to a two-way broadcast program on the remote control transmitter, or commander, for the receiving unit, and, further, the control buttons on the remote control transmitter are adapted to function in two ways and, thereby, the control buttons are kept from increasing in number and the remote control transmitter are prevented from becoming larger in size. Then, when the two-way button has been operated and the television receiver has been set into the responsive mode, the fact that the mode is the responsive mode is adapted to be displayed on the television receiver or the commander, and, hence, the viewer is prevented from making an operation mistake and enabled to make a reply to the two-way broadcast program easily and positively.

It will be appreciated by those skilled in the art that there are many changes, modifications and variations which can be made to the present invention without departing from scope and spirit of the claims appended hereto. All such changes, modifications and variations are fully contemplated by the present invention.

What is claimed is:

1. A receiving unit for two-way broadcasting comprising:

reception means for receiving a two-way broadcast program;

transmission means being selectable between an operative and responsive state or a nonoperative and nonresponsive state in response to a user initiated control signal for transmitting information of a reply to a multiple-choice question in a received two-way broadcast program to a specific destination;

control signal input means for receiving user initiated commands and for feeding the user initiated control signal to the transmission means;

video display means for selectively displaying the two-way broadcast program or a video program;

means for displaying the state of said transmission means on said video display means; and discrimination means for discriminating whether said transmission means is in the nonoperative and nonresponsive state or the operative and responsive state, wherein when said transmission means is decided to be in the responsive state by said discrimination means, the state of said transmission means being responsive is displayed on said video display means.

2. A receiving unit for two-way broadcasting according to claim 1, further comprising:

function conversion means for converting a predetermined control function of said reception means to a choose and reply function to said multiple-choice question when the state of said transmission means is decided to be the responsive state by said discrimination means.

3. A receiving unit for two-way broadcasting according to claim 1, wherein said display means is means for displaying information about two-way broadcast program received by said reception means, and when the operating state of said transmission means is decided to be said responsive state by said discrimination means, information of the reply in the responsive state is displayed on said display means.

4. A remote control unit for a receiving unit for two-way broadcasting, comprising:

control means for controlling from a distance a receiving unit for receiving a two-way broadcast program and transmitting information of a reply to a received two-way broadcast program to a specific destination;

switching control means for switching the operating state of said receiving unit to a state responsive to said two-way broadcast program;

display means for displaying the state of said receiving unit being responsive, wherein when the operating state of said receiving unit is switched to the responsive state by said switching control means, the state of said receiving unit being responsive is displayed on said display means; and function conversion means for converting a predetermined control function of said control means to a choose and reply function to said two-way broadcast program when the state of said receiving unit is switched to said responsive state by said switching control means.

5. A television broadcast receiver comprising:

a tuner for receiving a broadcast signal comprising DTMF data;

a transmitter being selectable between an operative state and in inoperative state for transmitting user input data to a predetermined destination specified by said DTMF data;

data input means for inputting the user input data fed to said transmitter;

a detector, responsive to said DTMF data received via said tuner, for determining whether the user input data has been requested via said DTMF data;

a controller for controlling said transmitter to transmit the user input data input via said data input means where said detector has determined that the user input data is requested; and function conversion means for converting a predetermined control function of said controller to a choose and reply function to said two-way broadcast program when the state of said broadcast receives is switched to said operative state.

6. A television broadcast receiver according to claim 1 wherein said user input means comprises a plurality of user actuable switches.

7. A television broadcast receiver according to claim 5 further comprising video display means for providing a visual indication when said detector has determined the user input data is requested.

8. A television broadcast receiver according to claim 5 wherein said data input means comprises a remote controller.

9. A television broadcast receiver according to claim 8 wherein said remote controller comprises a display for providing a visual indication when said detector has determined that the user input data is requested.

* * * * *